3,705,182
16β-DIFLUOROMETHYL AND 16-DIFLUORO-
METHYLENE STEROIDS AND PROCESSES
FOR THEIR PREPARATION
John A. Edwards, Los Altos, and John H. Fried, Palo
Alto, Calif., and John S. Mills, London, England, assignors to Syntex Corporation, Panama, Panama
No Drawing. Filed Feb. 24, 1970, Ser. No. 13,813
Int. Cl. C07c 169/32, 169/34
U.S. Cl. 260—397.4                    13 Claims

ABSTRACT OF THE DISCLOSURE

Steroids of the 16β-difluoromethyl and 16-difluoromethylene pregnane series are described. These compounds are useful as progestational and anti-inflammatory agents. Also described are processes useful for preparing these compounds from corresponding $\Delta^{16}$ pregnane starting compounds utilizing 16α-benzenesulfonyldifluoromethyl-20-keto,16-difluoromethyl-$\Delta^{16}$, 16α - benzenesulfonyldifluoromethyl-20-hydroxy and 16-difluoromethylene-20-hydroxy pregnane intermediates.

---

The present invention relates to novel processes which are useful in the preparation of steroidal compounds. The present invention also relates to the novel and useful steroidal compounds thus prepared. Specifically, this invention is directed to novel and useful 16β-difluoromethyl and 16-difluoromethylene steroids in the pregnane and 19-nor pregnane series and to novel processes useful for preparing these compounds.

The present invention, in a first aspect, is directed to compounds selected from those represented by the following Formulas A, B, and C:

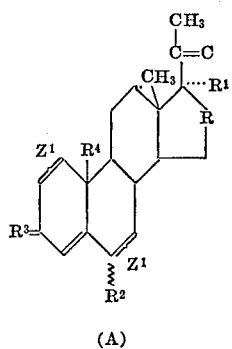

(A)

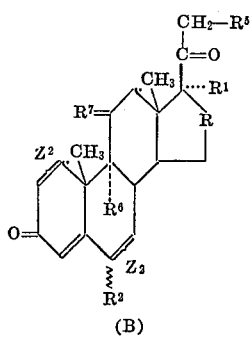

(B)

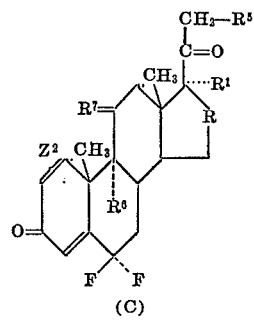

(C)

wherein, in each applicable formula,

R is the group

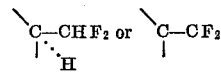

$R^1$ is hydrogen, hydroxy or a conventional hydrolyzable ester;
$R^2$ is hydrogen, methyl, chloro, or fluoro;
$R^3$ is oxo or the group

wherein $R^8$ is hydroxy or a conventional hydrolyzable ester;
$R^4$ is hydrogen or methyl;
$R^5$ is hydroxy, a conventional hydrolyzable ester, bromo, chloro, or fluoro;
$R^6$ is hydrogen, chloro, or fluoro;
$R^7$ is oxo or the group

wherein $R^9$ is hydroxy or chloro;
$Z^1$ is a carbon-carbon single bond, a carbon-carbon double bond, or the group

wherein X is hydrogen or fluoro; and
$Z^2$ is a carbon-carbon single bond or a carbon-carbon double bond;

provided that, (1) $R^4$ is hydrogen only when $Z^1$ (at C-1,2 position) is a carbon-carbon single bond, and
(2) when $R^9$ is chloro, $R^6$ is chloro.

The present invention, in a second aspect, is directed to processes useful for preparing the compounds selected from those represented by Formulas A, B, and C, above. The process aspect of the present invention whereby these compounds are prepared comprises:

(I) treating a steroid of the pregnane and 19-nor pregnane series having, as the only site of keto conjugated unsaturation the $\Delta^{16}$-20-keto functional system, with difluoromethylphenylsulfone and an alkali metal alkoxide to prepare the corresponding 16α-(benzenesulfonyldifluoromethyl)-20-keto steroid; and (II) treating the product of step (I):

(a) with an alkali metal alkoxide to prepare the corresponding 16-difluoromethyl-$\Delta^{16}$ - 20 - keto compound and hydrogenating the latter to prepare the corresponding 16β-difluoromethyl-20-keto steroid; or (b) by reduction to prepare the corresponding 16α-(benzenesulfonyldifluoromethyl) - 20 - hydroxy steroid, treating the latter with an alkali metal alkoxide in organic solution to prepare the corresponding 16 - difluoromethylene - 20 - hydroxy steroid, and oxidizing the latter to prepare the corresponding 16-difluoromethylene-20-keto steroid or (c) treating the product of step (b) with base to prepare the corresponding 16-difluoromethyl-Δ16-20-keto compound and hydrogenating the latter to prepare the corresponding 16-difluoromethyl-20-keto steroid, and, if desired, (d) hydroxylating the product of step (a), (b), and (c) to prepare the corresponding 16β-difluoromethyl-17α-hydroxy-20-keto, 16-difluoromethylene-17α-hydroxy-20-keto and 16β-difluoromethyl-17α-hydroxy - 20 - keto compounds, respectively, followed, in optional order and to the extent required and desired, by:

(1) introduction of keto conjugated unsaturation in Rings A and B;
(2) introduction of an 11β-hydroxy group;
(3) introduction of C–11 keto oxygen;
(4) introduction of C–21 elaboration;
(5) introduction of C–17α elaboration;
(6) introduction of C–9,11 halogen;
(7) introduction of C–6 halo or methyl;
(8) introduction of C–1,2 methylene or difluoromethylene;
(9) introduction of C–6,7 methylene or difluoromethylene;
(10) reduction of C–3 keto to C–3 hydroxy; and
(11) esterification of C–3 hydroxy.

The foregoing generic process can be depicted by the following reaction scheme of partial formulas (Ring D only):

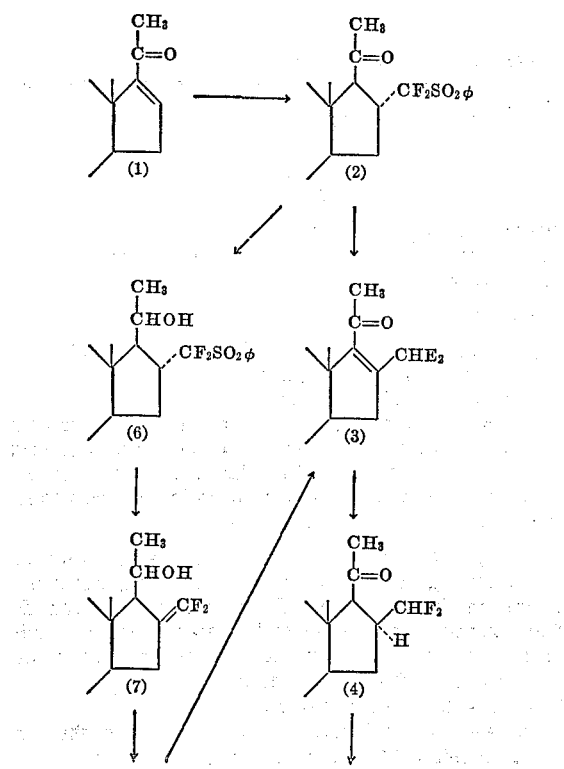

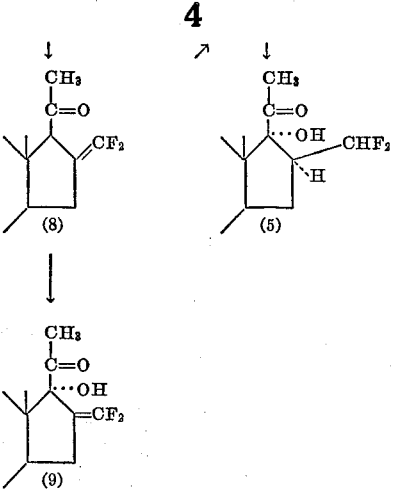

wherein the symbol (φ) denotes the phenyl group.

Specifically, the present invention, in its process aspect, is directed to the process which comprises treating a steroid of the pregnane and 19-nor pregnane series having, as the only site of keto conjugated unsaturation the Δ16-20-keto functional system, with difluoromethylphenylsulfone and an alkali metal alkoxide to prepare the corresponding 16α-(benzenesulfonyldifluoromethyl)-20-ketosteroid (2), treating the latter with an alkali metal alkoxide to prepare the corresponding 16-difluoromethyl-Δ16-20-keto compound (3), and hydrogenating the latter to prepare the corresponding 16β-difluoromethyl-20-keto steroid (4).

The present invention is also directed to the process which comprises treating a steroid of the pregnane and 19-nor pregnane having, as the only site of keto conjugated unsaturation the Δ16-20-keto functional system, with difluoromethylphenylsulfone and an alkali metal alkoxide to prepare the corresponding 16α-(benzenesulfonyldifluoromethyl)-20-keto steroid (2), reducing the latter to prepare the corresponding 16α-(benzenesulfonyldifluoromethyl)-20-hydroxy steroid (6) treating the latter with an alkali metal alkoxide in organic solution to prepare the corresponding 16-difluoromethylene-20-hydroxy steroid (7) and oxidizing the latter to prepare the corresponding 16-difluoromethylene-20-keto steroid (8).

The present invention is also directed to the process which comprises treating a steroid of the pregnane and 19-nor pregnane series having, as the only site of keto conjugated unsaturation the Δ16-20-keto functional system, with difluoromethylphenylsulfone and an alkali metal alkoxide to prepare the corresponding 16α-(benzenesulfonyldifluoromethyl)-20-keto steroid (2).

The present invention is also directed to the process which comprises treating a 16α-(benzenesulfonyldifluoromethyl)-20-keto steroid (2) with an alkali metal alkoxide to prepare the corresponding 16-difluoromethyl-Δ16-20-keto steroid (3).

The present invention is also directed to the process which comprises reducing a 16α-(benzenesulfonyldifluoromethyl)-20-keto steroid (2) to prepare the corresponding 16α - (benzenesulfonyldifluoromethyl)-20-hydroxy steroid (6) and treating the latter with an alkali metal alkoxide in organic solution to prepare the corresponding 16-difluoromethylene-20-hydroxy steroid (7).

The present invention represented above by the several steps is practiced as follows. The first step involves reacting together a Δ16-20-keto steroid with difluoromethylphenylsulfone and an alkali metal alkoxide such as potassium t-butoxide, potassium t-amylate, and the like. The reaction is conveniently conducted in liquid organic reaction media. Suitable such media include the conventionally employed organic solvents such as diglyme, triglyme, diethyl ether, tetrahydrofuran, and the like or mixture thereof. The reaction is further conducted at temperatures ranging from about −40° C. to about −100° C.

and for a period of time sufficient to produce product preferably from about 2 hours to about 6 hours. The reaction is conveniently and preferably conducted under an inert atmosphere such as nitrogen, argon, etc.

The reaction proceeds on a mole per mole basis of starting compounds, however, product is prepared when employing any proportion of reactants. In the preferred embodiments, from about 1 to about 5 moles of each of the difluoromethylphenylsulfone and alkali metal alkoxide are employed per mole of starting steroid.

The reactants are contacted and maintained together in any convenient fashion and within the given temperature range for a period of time sufficient to produce product. Thereafter, the reaction mixture is conventionally processed such as via decantation, filtration, evaporation, distillation, and chromatography to separate and isolate product.

The product 16α-(benzenesulfonyldifluoromethyl) steroid (2) is then reacted together with an alkali metal alkoxide, such as those described above for the first step, either directly (2) or after prior reduction of the 20-keto group (6) such as with lithium aluminum t-butoxide in tetrahydrofuran or other reduction methods known per se—see Djerrassi, Steroid Reaction, Holden-Day, Inc., San Francisco, 1963, chapter ". . . Selective Reductions of Polycarbonyl Steroids" by Neustaedter, which is hereby incorporated by reference.

In the alkali metal alkoxide method performed upon compounds (2) or (6), suitable alkali metal alkoxide useful for this purpose include those defined above for the first step reaction. This reaction is conveniently conducted in liquid organic reaction media such as those listed above for the first step reaction or dimethylsulfoxide. The reaction is further conducted at temperatures ranging from about $-20°$ C. to about $0°$ C. and for a period of time sufficient to produce product preferably from about four hours to about 12 hours.

Although product is prepared when employing any proportion of reactants, in the preferred embodiments, from about 1 to about 10 moles of the alkali metal alkoxide is employed per mole of starting steroid.

The reaction is conveniently initiated and maintained and the product isolated and separated in accordance with conventional convenient techniques as described above for the first step reaction.

The 16-difluoromethylene-20-hydroxy product (7), when prepared, is thereafter oxidized to form the corresponding 16-difluoromethylene-20-keto compound (8) such as with chromic acid and acetone or other oxidative methods known per se—Djerrassi, Steroid Reactions, Holden-Day, Inc., San Francisco, 1963, chapter "Selective Oxidations of Polyhydroxy Steroids . . ." by Neustaedter, which is hereby incorporated by reference.

The 16-difluoromethyl-$\Delta^{16}$-20-keto compound (3), when prepared, is hydrogenated such as with hydrogen over a palladium or platinum catalyst or other reduction methods known per se to prepare the corresponding 16β-difluoromethyl-20-keto steroid product (4).

Each of the 16-difluoromethylene-20-keto and 16β-difluoromethyl-20-keto products can be hydroxylated to prepare the corresponding 17α-hydroxy compound (9) and (5) by contacting the steroid with an oxygen atmosphere while the steroid is dispersed in a basic solution conveniently formed with organic solvent such as those described above for the first reaction together with triethylphosphite. The reaction is further conducted at temperatures ranging from about $-20°$ C. to about $0°$ C. and for a period of time sufficient to produce product preferably from about 2 hours to about 24 hours. The reaction is conveniently initiated and maintained and the product separated and isolated via conventional methods in the art, as described above.

Alternatively, the 16-difluoromethyl-$\Delta^{16}$-20-keto compound (3) can be prepared from the 16-methylene-20-keto compound (8) by reacting it together with a 0.5– 2% solution of potassium t-butoxide in t-butanol, sodium methoxide in methanol, hydrogen chloride in methanol, etc.

In the preferred embodiments, the optional elaborative groupings at the other sites of the molecule are introduced prior to the novel, principal reaction hereof. However, protection is preferably provided for those groups which compete or interfere with the principal reaction hereof or with the processes preparative to the principal reaction hereof. Examples of such protection include conventionally forming the dienol ether or ester from the 3-keto-$\Delta^4$ system or by forming the ketal of the 3-oxo function. The original functional systems can be restored later via methods known per se.

Upon the introduction of the 16β-difluoromethyl and 16-difluoromethylene groupings, as described above, the products of the present invention can be further elaborated so as to prepare the other compounds embraced by Formulas A, B, and C above.

For example, the protected keto conjugated unsaturation present in Rings A and B of the starting compound can be restored. Thus, the dienol ether or ester or the 3-ketal can be cleaved so as to restore the 3-keto-$\Delta^4$ system. Thereafter, unsaturation of the C–1,2 position can be accomplished with dichlorodicyano-1,4-benzoquinone in accordance with known procedures so as to prepare the 3-keto-$\Delta^{1,4}$-dienes. Similarly, the 3-keto-$\Delta^{4,6}$-dienes are prepared with chloranil in ethyl acetate and acetic acid or in xylene. The 3-keto-$\Delta^{1,4,6}$-trienes are prepared by treating the 3-keto-4,6-dienes with chloranil in n-amyl alcohol.

Methylene and difluoromethylene groups can be introduced across the C–1,2 and C–6,7 double bonds by treatment of the unsaturated compound with dimethylsulfoxonium methylide on the one hand, and sodium chlorodifluoroacetate on the other, as set forth in U.S. Pat. Nos. 3,243,434 and 3,338,928, respectively, which are hereby incorporated by reference. For the C–1,2 position, the reaction is conducted upon a 3-keto-$\Delta^{1,4}$ or a 5α-3-keto-$\Delta^1$ compound, in the latter instance the $\Delta^4$ unsaturation being introduced subsequent, via the conventional method of treatment with bromine, sodium iodide, chromium chloride, and potassium carbonate. For the C–6,7 position, the reaction is conducted upon a 3-keto-$\Delta^{4,6}$ compound. If desired, the 1,2:6,7-bismethylene, -bisdifluoromethylene or -methylene; difluoromethylene substituents can be introduced, in the preferred embodiments, by reacting the appropriate reagent with the 5α-3-keto-$\Delta^1$ compound, introducing the $\Delta^{4,6}$ unsaturation as described above and treating this compound with the appropriate reagent.

Before the described elaborations at the C–6,7 positions, the substituents selected from chloro, fluoro, and methyl can be introduced at the C–6 position. For example, the 6-methyl group is introduced by treating a 3-hydroxy-$\Delta^5$ compound with a peracid such as perbenzoic acid to form the corresponding 5α,6α-oxido compound. This is then treated with methylmagnesium bromide to form the corresponding 6β-methyl-3β,5α-diol. The 3β-hydroxy group is then acylated conventionally and the 5α-hydroxy group of the acylated compound removed by reaction with thionyl chloride to form the corresponding 3β-acetoxy-6-methyl-$\Delta^{5(6)}$ compound. The ester group is saponified and the 3β-hydroxy compound subjected to Oppenauer oxidation to form the corresponding 6α-methyl-3-keto-$\Delta^4$ compound—see U.S. Pat. 3,158,629.

The 6-chloro and 6-fluoro compounds are prepared by preparing the enol ether of the 3-keto-$\Delta^{4,6}$ compounds with ethylorthoformate and treating the resultant enol ether with N-chlorosuccinimide or perchloryl fluoride to prepare the 3-keto-$\Delta^4$-6-chloro and -fluoro compounds, respectively. Double bond unsaturation can then be introduced on the product 6-substituted compounds at the C–6,7 position and these compounds then treated as described above to form the corresponding 6-substituted-6,7-methylene and -difluoromethylene compounds.

Substituents at C–9,11 are introduced by incubating the C–11 unsubstituted compound with *Curvularia lunata* or *Cunninghamella bainieri* to form the corresponding 11β-hydroxy compound. This compound can be oxidized under Moffatt conditions to form the 11-keto compound or it can be dehydrated with mesyl chloride to form the $\Delta^{9(11)}$-ene. The $\Delta^{9(11)}$-ene can be chlorinated with chlorine to form the 9α,11β-dichloro compound or it can be converted to the 9β,11β-oxido compound through the bromohydrin intermediate. The 9β,11β-oxido compound can be converted to the 9α-fluoro or -chloro-11β-hydroxy compound by treatment with hydrogen fluoride and hydrogen chloride, respectively.

The C–21 carbon atom can be brominated with bromine or iodinated with iodine and the bromo or iodine compound then converted to the 21-acetate with sodium iodide and potassium acetate or calcium oxide and potassium acetate. The acetate can be hydrolyzed with base and the resultant 21-hydroxy compound treated sequentially with methanesulfonyl chloride, sodium iodide, and silver fluoride to prepare the 21-fluoro compound. The 21-chloro compound is prepared by converting the 21-hydroxy to its alkyl or arylsulfonate ester and treating this with lithium chloride.

The 6,6-difluoro groups are introduced by twice consecutively forming the enol ether of a 3-keto-$\Delta^4$ compound and treating it with perchloryl fluoride to prepare, in the first sequence, the 6-monofluoro compound and, in the second instance, the 6,6-difluoro compound.

Primary and secondary hydroxy groups are esterified by treatment with the appropriate acid anhydride in pyridine and tertiary hydroxyls by treatment with the appropriate acid and acid anhydride in p-toluenesulfonic acid.

The 3-keto compounds are reduced with sodium borohydride and the resultant 3-hydroxy compounds esterified and etherified in accordance with methods known per se.

The compounds represented above by Formula A demonstrate progestational activity and are useful in the manner corresponding to such activity such as in the treatment of various menstrual disorders and in the control and regulation of fertility.

The compounds represented by Formulas B and C demonstrate anti-inflammatory activity and are useful in the manner corresponding to such activity such as in the treatment of contact dermatitis, arthritis, and so forth.

In these uses, the compounds of the present invention can be used in the same manner as other compounds having and being used in accordance with similar activity, such as norethisterone and fluocinolone acetonide.

The starting compounds of the present invention are the $\Delta^{16}$-20-keto steroids otherwise corresponding to the products depicted by Formulas A, B, and C above. These starting compounds will have, as the only site of keto conjugated unsaturation the $\Delta^{16}$-20-keto functional system. These starting compounds are known and can be prepared by known methods.

In the present specification and the claims, the term "carboxylic acyl group" and "carboxylic acyloxy group" denote acyl and acyloxy groups which contain less than 12 carbon atoms and which can be of a straight, branched, or cyclic chain structure. This structure can be saturated, unsaturated, or aromatic and optionally substituted by functional groups, such as hydroxy, alkoxy containing up to five carbon atoms, acyloxy containing up to 12 carbon atoms, nitro, amino, halogeno, and the like. Representative esters thus include acetate, propionate, enanthate, benzoate, trimethylacetate, t-butylacetate, phenoxyacetate, cyclopentylpropionate, aminoacetate, β-chloropropionate, adamantoate, bicyclo[2.2.2]oct-2-ene-1-carboxylate, 4-methylbicyclo[2.2.2]oct-2-ene-1-carboxylate, and so forth.

In the present specification and in the claims, the wavy line ($\xi$) is designated to include the configurations alpha, beta, and mixtures of the alpha and beta isomers.

The term "alkoxide" refers to a hindered tertiary alkoxide containing from 4 to 8 carbon atoms.

The following examples serve to further illustrate the manner by which the present invention can be practiced and represent, in one aspect, the best mode for carrying out the invention. As such, however, they should be construed merely as illustrative and not as limitative upon the overall scope hereof.

EXAMPLE 1

3β-acetoxypregna-5,16-diene-20-one (35.6 grams) and 38.4 grams of difluoromethylphenylsulfone are dispersed in the mixture of 500 milliliters of diglyme and 150 milliliters of diethyl ether. The resultant solution is kept under a nitrogen atmosphere and at a temperature of −78° C. Potassium t-butoxide (22.4 grams) is dispersed in 150 milliliters of diglyme at room temperature and the resultant solution is added dropwise over a period of 1.5 hours to the steroid sulfone solution. The resultant mixture is allowed to stand at −78° C. for one hour after which time it is poured into ice water and extracted with ether. The extracts are filtered to provide a residue which is combined with the residue obtained by evaporating the extracts to provide the 3β-acetoxy-16α-(benzenesulfonyldifluoromethyl)pregn-5-en-20-one product which may be further purified by recrystallization from methanol.

A steroid solution is prepared by dispersing 21.2 grams of 3β-acetoxy-16α-(benzenesulfonyldifluoromethyl)pregn-5-en-20-one in 250 milliliters of anhydrous tetrahydrofuran under a nitrogen atomshpere at 0° C. While stirring this solution, a mixture of 40 grams of potassium t-butoxide dispersed in 200 milliliters of tetrahydrofuran is added thereto. After allowing the reaction mixture to be maintained under these conditions for two and one-half hours after the addition, 10 milliliters of water are added thereto and the resultant mixture allowed to stand for 10 minutes. After this time, it is poured into ice water and extracted with diethyl ether. The extracts are evaporated and the residue chromatographed to provide the 16-difluoromethylpregna-5,16-dien-3β-ol-20-one product.

One gram of 16-difluoromethylpregna-5,16-dien-3β-ol-20-one in 50 ml. of ethyl acetate is hydrogenated for 15 hours with 0.3 grams of 5% palladium-on-charcoal catalyst at atmospheric pressure and room temperature. The catalyst is then removed by filtration and the filtrate evaporated to yield 16β-difluoromethylpregn-5-en-3β-ol-20-one which is recrystallized from acetone.

EXAMPLE 2

3β-acetoxypregna-5,16-dien-20-one (35.6 grams) and 38.4 grams of difluoromethylphenylsulfone are dispersed in the mixture of 500 milliliters of diglyme and 150 milliliters of diethyl ether. The resultant solution is kept under a nitrogen atmosphere and at a temperature of −78° C. Potassium t-butoxide (22.4 grams) is dispersed in 150 milliliters of diglyme at room temperature and the resultant solution is added dropwise over a period of 1.5 hours to the steroid sulfone solution. The resultant mixture is allowed to stand at −78° C. for one hour after which time it is poured into ice water and extracted with ether. The extracts are filtered to provide a residue which is combined with the residue obtained by evaporating the extracts to provide the 3β-acetoxy-16α-(benzenesulfonyldifluoromethyl)-pregn-5-en-20-one product which may be further purified by recrystallization from methanol.

A solution of 1 g. of 3β-acetoxy-16α-(benzenesulfonyldifluoromethyl)-pregn-5-en-20-one in 50 ml. of methanol is stirred overnight at room temperature with a solution of potassium hydroxide (4%) in 1 ml. of water. The reaction mixture is then poured into ice water and the solid which forms is collected by filtration, washed with water to neutrality and dried to yield 16α-(benzenesulfonyldifluoromethyl)pregn-5-en-3β-ol-20-one which is recrystallized from methylene chloride:ether.

Two milliliters of dihydropyran are added to a solution of 1 g. of 16α-(benzenesulfonyldifluoromethyl)-pregn-5-en-3β-ol-20-one in 15 ml. of benzene. About 1 ml. is removed by distillation to remove moisture and 0.04 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina; eluting with hexane, to yield the 3β-tetrahydropyran - 2' - yloxy - 16α(benzenesulfonyldifluoromethyl)-pregn-5-en-20-one product which is recrystallized from pentane.

A solution of 2 g. of 3β-tetrahydropyran-2'-yloxy-16α-(benzenesulfonyldifluoromethyl) - pregn - 5 - en - 20 - one in 20 ml. of anhydrous tetrahydrofuran is cooled to —75° C. in a Dry Ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 3β-tetrahydropyran - 2' - yloxy - 16α - (benzenesulfonyldifluoromethyl)pregn-5-en-20-ol.

A solution of 2 g. of 3β-tetrahydropyran-2'-yloxy-16α-(benzenesulfonyldifluoromethyl)pregn - 5 - en-20-ol in 20 ml. of anhydrous tetrahydrofuran is cooled to —75° C. in a Dry Ice-acetone bath and treated with a previously cooled solution of 0.6 g. of potassium t-butoxide in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 3β-tetrahydropyran-2'-yloxy-16-difluoromethylenepregn-5-en-20-ol.

To a mixture of 1 g. of 3β-tetrahydropyran - 2' - yloxy-16-difluoromethylenepregn-5-en-20-ol in 30 ml. of acetic acid is added 0.5 ml. of 2 N hydrochloric acid. The mixture is allowed to stand 5 hours at room temperature and then diluted with ice water and extracted several times with methylene chloride. The combined extracts are washed with water to neutrality, dried over sodium sulfate and evaporated to dryness to yield 16-difluoromethylenepregn-5-ene-3β,20-diol which is recrystallized from acetone:hexane.

A solution of 1 g. of 16-difluoromethylenepregn-5-ene-3β,20-diol in 80 ml. of toluene and 20 ml. of cyclohexane is dried by removing 10 ml. of solvent by distillation. A solution of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 16-difluoromethylenepregn-4-ene-3,20-dione which may be further purified by recrystallization from acetone:hexane.

A solution of 6 g. of 3β-tetrahydropyran-2'-yloxy-16-difluoromethylenepregn-5-en-20-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-tetrahydropyran - 2' - yloxy-16-difluoromethylenepregn - 5 - en - 20 - one which may be further purified by recrystallization from acetone:hexane.

EXAMPLE 3

0.15 gram of a 50% sodium hydride dispersed in mineral oil is washed three times with 10 ml. portions of dry hexane. To this washed sodium hydride dispersion is added a mixture of 0.5 ml. of t-butanol and 2.5 ml. of dimethylformamide and 0.25 ml. of triethylphosphite. The resultant mixture is cooled to —25° C. and allowed to equiliberate in an oxygen atmosphere. To the equiliberated mixture are added 20 ml. of 3β-tetrahydropyran-2'-yloxy-16-difluoromethylenepregn-5-en-20-one dispersed in 2 ml. of tetrahydrofuran. The resultant mixture is stirred at —25° C. until one molar equivalent of oxygen is consumed. Water is then added to the reaction mixture and the aqueous mixture extracted with methylene chloride, the methylene extracts washed with water, dried and evaporated to provide the 3β-tetrahydropyran-2'-yloxy-16-difluoromethylenepregn-5-en-17α-ol-20-one product.

This product is hydrolyzed by treatment with 1% oxalic acid and aqueous methanol at room temperature to provide the 16-difluoromethylenepregn-5-ene-3β,17α-diol-20-one product.

In a similar manner, 16β-difluoromethylpregn-5-ene-3β,17α-diol-20-one is prepared from the corresponding 17α-desoxy compound.

EXAMPLE 4

16-difluoromethylenepregn-5-en-3β-ol-20-one (5.3 g.) in 60 ml. of tetrahydrofuran is stirred under nitrogen at 0° C. and treated with potassium t-butoxide (8 g.) in 40 ml. of tetrahydrofuran. After 5 hours at 0° C., the solution is poured into water and the product isolated with ether. Trituration with hexane gives the 16-difluoromethylpregna-5,16-dien-3β-ol-20-one product which can be recrystalized from aqueous methanol and from methylene chloride-hexane.

One gram of 16-difluoromethylpregna-5,16-dien-3β-ol-20-one in 50 ml. of ethyl acetate is hydrogenated for 15 hours with 0.3 g. of 5% palladium-on-charcoal catalyst at atmospheric pressure and room temperature. The catalyst is then removed by filtration and the filtrate evaporated to yield 16β-difluoromethylpregn-5-en-3β-ol-20-one which is recrystallized from acetone.

This can be oxidized as described in the penultimate paragraph of Example 2 to give 16β-difluoromethylpregn-4-ene-3,20-dione.

EXAMPLE 5

3-ethoxypregna-3,5,16-triene-20-one (0.1 mole) and 0.2 mole of difluoromethylphenylsulfone are dispersed in 500 ml. of tetrahydrofuran and the entire mixture is kept under a nitrogen atmosphere and cooled to 0° C. Sodium t-amylate (0.2 mole) in 100 ml. of tetrahydrofuran are added dropwise to the cooled mixture over a period of two hours. The resultant mixture is then poured into ice water and extracted with diethyl ether. The extracts are filtered to provide the 3-ethoxy-16α-(benzenesulfonyldifluoromethyl)-pregna-3,5-dien-20-one product.

In a similar manner, 3,3-ethylenedioxy-16α-(benzenesulfonyldifluoromethyl)pregn-5-en-20-one is prepared.

EXAMPLE 6

The procedure as set forth in the second paragraph of Example 1 is repeated except diglyme is employed in lieu of tetrahydrofuran, sodium t-amyloxide is employed in lieu of potassium t-butoxide and 3-ethoxy-16α-(benzenesulfonyldifluoromethyl)pregna-3,5 - dien - 20 - one is employed as the starting material to prepare the corresponding 3-ethoxy-16-difluoromethylpregna-3,5,16-trien-20-one product.

EXAMPLE 7

The procedure as set forth in the fifth paragraph of Example 2 is repeated except diglyme is used in lieu of tetrahydrofuran, sodium t-amyloxide is used in lieu of potassium t-butoxide and 3-ethoxy-16α-(benzenesulfonyldifluoromethyl)pregna-3,5-dien-20-ol is employed as the starting material to prepare the corresponding 3-ethoxy-16-difluoromethylenepregna-3,5-dien-20-ol product.

The foregoing examples illustrate the procedures by which the other optional elaborative groups at the other portions of the steroid molecule can be introduced.

EXAMPLE 8

To a solution of 1 g. of 3-ethoxy-16β-difluoromethylpregna-3,5-dien-20-one in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 16β-difluoromethylpregn-4-ene-3,20-dione.

A mixture of 0.5 g. of 3,3-ethylenedioxy-16-difluoromethylenepregn-5-en-17α-ol-20-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 16-difluoromethylenepregn-4-en-17α-ol-3,20-dione which is recrystallized from acetone:hexane.

EXAMPLE 9

Two equivalents of bromine in 15 ml. of glacial acetic acid are added dropwise to a solution of 1 g. of 16β-difluoromethylpregnan-3,20-dione in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is combined with 10 ml. of collidine and refluxed for 30 minutes. The cooled solution is filtered and the filtrate is diluted with ether, washed with dilute hydrochloric acid, aqueous sodium bicarbonate solution and water. The dried organic phase is evaporated to yield 16β-difluoromethylpregn-4-ene-3,20-dione which is recrystallized from ether:hexane.

A mixture of 0.5 g. of 16β-difluoromethylpregn-4-en-17α-ol-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 16β-difluoromethylpregna-1,4-dien-17α-ol-3,20-dione which is further purified by recrystallization from acetone:hexane.

A mixture of 1 g. of 16-difluoromethylenepregn-4-en-17α-ol-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 16 - difluoromethylenepregna - 4,6-dien-17α-ol-3,20-dione which may be further purified by recrystallization from acetone:hexane.

A mixture of 1 g. of 16-difluoromethylenepregna-4,6-dien-17α-ol-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 16-difluoromethylenepregna-1,4,6-trien-17α - ol - 3,20 - dione which may be further purified through recrystallization from acetone:hexane.

To a stirred solution of 1 g. of 16β-difluoromethylpregnane-3,20-dione and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 16β-difluoromethylpregn-1-ene-3,20-dione which may be recrystallized from cyclohexane:ethyl acetate.

EXAMPLE 10

A solution of 0.5 g. of 16β-difluoromethylpregn-1-ene-3,20-dione is 5 ml. of dimethyl sulfoxide is added to a solution of 1 equivalent of dimethylsulfoxonium methylide in dimethylsulfoxide, prepared in the manner of Corey et al. J. Am. Chem. Soc., 87, 1353 (1965). The mixture is stirred under nitrogen and at room temperature for 20 hours and then at 50° C. for 7 hours. Fifty milliliters of water are then added the resulting mixture extracted four times with 50 ml. of ethyl acetate. The combined extracts are washed with $H_2O$ and saturated aqueous sodium chloride solution, dried over sodium sulfate and evaporated to dryness. This residue is then chromatographed on silica, eluting with ether:methylene chloride to yield 1α,2α - methylene - 16β - difluoromethylpregnane - 3,20-dione and 1β,2β - methylene - 16β - difluoromethylpregnane-3,20-dione.

In like manner, the foregoing procedure can be practiced upon a $\Delta^{4,6}$-diene compound so as to prepare the corresponding 6α,7α-methylene and 6β,7β-methylene compounds.

Similarly, the foregoing reaction can be conducted upon a 1,2-methylene-$\Delta^{4,6}$ compound, the latter being prepared from the 1,2-methylenepregnane compound, as described in Example 9, to thus prepare the corresponding 1,2;6,7-bismethylene compound.

To a stirred and refluxing solution of 1 g. of 16β-difluoromethylpregn - 1 - ene - 3,20-dione in 10 ml. of dimethyl triethylene glycol ether, is added in a dropwised fashion and under nitrogen, a 50% w./v. solution of sodium trichloroacetate. When the addition of 5 equivalents of reagent fails to produce an appreciable change in the U.V. spectrum, the addition is stopped. The solution is cooled and filtered and the filtrate is evaporated to dryness under reduced pressure. The residue thus obtained is chromatographed on alumina, eluting with methylene chloride, to yield 1α,2α - dichloromethylene-16β - difluoromethylpregnane - 3,20 - dione and 1β,2β-dichloromethylene - 16β - difluoromethylpregnane-3,20-dione.

In like manner, the foregoing can be practiced upon the corresponding $\Delta^{4,6}$ compounds so as to prepare the corresponding 6α,7α - dichloromethylene and 6β,7β-dichloromethylene products.

In like manner, the foregoing can be practiced upon a 1,2 - dichloromethylene product after introduction of the $\Delta^6$ unsaturation or upon a 1,2-methylene product after introduction of the $\Delta^6$-unsaturation so as to respectively prepare the corresponding 1,2;6,7-bisdichloromethylene and/or 1,2-methylene-6,7-dichloromethylene products.

To a stirred and refluxing solution of 1 g. of 16β-difluoromethylpregn-1-ene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which form is collected, washed with water, dried and chromatographed on alumina, eluting with methylene chloride, to yield 1α,2α - difluoromethylene-16β-difluoromethylpregnane-3,20-dione and 1β,2β - difluoromethylene-16β - difluoromethylpregnane-3,20-dione.

In like manner, the foregoing can be practiced upon the corresponding Δ$^{4,6}$ compounds so as to prepare the corresponding 6α,7α-difluoromethylene and 6β,7β-difluoromethylene products.

In like manner, the foregoing can be practiced upon a 1,2-dichloromethylene product after introduction of the Δ$^6$ unsaturation or upon a 1,2-methylene product after introduction of the Δ$^6$-unsaturation so as to respectively prepare the corresponding 1,2-dichloromethylene-/and/or 1,2-methylene-6,7-difluoromethylene products.

EXAMPLE 11

A mixture of 5 g. of 3 - ethoxy - 16β-difluoromethylpregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperatures and then diluted with water. After being allowed to stand at 0° C. for 15 hours, the solid is collected by filtration, washed with water and dried under vacuum to yield 6β-chloro-16β-difluoromethylpregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water, and dried to yield 6α-chloro-16β-difluoromethylpregn-4-ene-3,20 - dione which is recrystallized from acetone:hexane.

A stream of perchloryl fluoride is passed through a solution of 1 g. of 3-ethoxy-16β-difluoromethylpregna-3,5-dien-20-one in 25 ml. of dimethylformamide, cooled to 0° C. for 5 minutes. After being allowed to slowly attain a temperature of 20° C., the solution is poured into water and extracted with ethyl acetate. These extracts are washed with saturated aqueous sodium bicarbonate solution and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoro-16β-difluoromethylpregn-4-ene-3,20-dione which is recrystallized from acetone:hexane.

EXAMPLE 12

To a suspension of 1 g. of 6α-fluoro-16β-difluoromethylpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6α-fluoropregna-3,5-dien-20-one which is recrystallized from acetone:hexane.

A stream of perchloryl fluoride is passed through a solution of 1 g. of 3-ethoxy-6α-fluoropregna-3,5-dien-20-one in 25 ml. of dimethylformamide, cooled to 0° C. for 5 minutes. After being allowed to slowly attain a tempera-ture of 20° C., the solution is poured into water and extracted with ethyl acetate. These extracts are washed with saturated aqueous sodium bicarbonate solution and with water to neutrality, dried over sodium sulfate and evaporated to dryness. The residue is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6,6-difluoropregn-4-ene-3,20-dione which is recrystallized from acetone:hexane.

EXAMPLE 13

A culture of *Cunninghamella bainieri* ATCC 9244 is prepared by incubating an aqueous medium containing 2% peptone and 5% corn syrup with a vegetating growth of the above culture in the same medium and stirring with aeration for 24 hours at 28° C.

To 340 ml. of this culture are then added 10 ml. of 1% ethanolic solution of 16-difluoromethylenepregn-4-en-17α-ol-3,20-dione. The mixture is stirred with aeration for 24 hours at 28° C. and then extracted several times with methylene chloride. These extracts are washed with water, dried over sodium sulfate, filtered and concentrated to a small volume under reduced pressure. The concentrated extracts are absorbed on a column of 20 g. of silica gel and 20 g. of Celite diatomaceous earth, previously washed with methylene chloride. Elution with 4:1 methylene chloride:acetone and crystallization yields 16-difluoromethylenepregn-4-ene-11β-17α-diol-3,20-dione.

One gram of 16-difluoromethylenepregn-4-ene-11β,17α-diol-3,20-dione is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate and evaporated to yield 16-difluoromethylenepregna - 4,9(11) - dien-17α-ol-3,20-dione which may be further purified by recrystallization from acetone:hexane.

To a solution of 1.6 g. of 16-difluoromethylenepregna-4,9(11)-dien-17α-ol-3,20-dione in 4 ml. of chloroform is added over a 5 minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate and evaporated to dryness to yield 9α,11β-dichloro-16-difluoromethylenepregn-4-en-17α-ol-3,20-dione which may be recrystallized from acetone:hexane.

To a mixture of 1 g. of 16-difluoromethylenepregna-4,9(11)-dien-17α-ol-3,20-dione, 200 ml. of pure dioxane and 1 ml. of 0.4 N perchloric acid is added 0.5 g. of N-bromoacetamide over a one hour period with stirring, in the dark and at room temperature. The reaction mixture is stirred for an additional hour and a solution of 10% sodium sulfite is then added until negative to potassium iodide-starch indicator paper. Ice is added and the mixture extracted with chloroform. These extracts are washed consecutively with water, 5% aqueous sodium bicarbonate solution and water, and the sovent then removed by distillation in vacuo. The residue is triturated with acetone to yield the bromohydrin intermediate.

A mixture of 0.5 g. of anhydrous potassium acetate and 25 ml. of acetone is heated almost to boiling and a solution of 1.7 g. of bromohydrin intermediate in 25 ml. of acetone is then slowly added with stirring. The mixture is refluxed for 10 hours, cooled and almost all of the acetone is removed by distillation. Iced water is then added and the solid which forms is collected by filtration, washed with water and dried to yield 9β,11β-oxido-16- difluoromethylenepregn-4-en-17α-ol-3,20-dione which may be further purified through recrystallization from methylene chloride:benzene.

To a stirred solution of 4 g. of 9β,11β-oxido-16-difluoromethylenepregn-4-en-17α-ol-3,20-dione in 40 ml. of anhydrous chloroform, are added over a period of 35 minutes and at 0° C., 30 ml. of a .45 N chloroform solution of dry hydrogen chloride. The mixture is stirred for 1 hour at 0° C. and then diluted with water. The organic layer is separated, washed with aqueous sodium bicarbonate solution and with water, dried over sodium sulfate and evaporated under reduced pressure to yield 9α-chloro-16 - difluoromethylenepregn - 4 - ene - 11β,17α-diol-3,20-dione which is recrystallized from acetone:hexane.

EXAMPLE 14

One gram of 16-difluoromethylpregn-4-ene-3,20-dione is dissolved in 20 ml. of methylene chloride. Five milliliters of solvent are then collected by distillation to remove moisture. The mixture is cooled to 20° C. and a solution of 2.05 molar equivalents of bromine in 7 ml. of methylene chloride is added under anhydrous conditions with stirring, half of the bromine solution being added in three equal portions over a 15 minute period with stirring but without further cooling, the remainder then being added in one portion. When bromine uptake is complete, a slight vacuum is applied to remove hydrogen bromide. The solution is then washed with aqueous sodium bicarbonate solution and with water, and evaporated to dryness under reduced pressure, the bath temperature not being allowed to exceed 35° C. The solid thus obtained may be used in the following step without further purification.

To a stirred solution of 1 g. of this solid in 10 ml. of dry acetone is added 0.9 g. of sodium iodide in three equal portions at 10 minute intervals, the temperature being maintained at or below 25° C. The reaction mixture is next allowed to stand at room temperature for 17 hours and is then poured into a stirred solution of 2 g. of sodium thiosulfate in 70 ml. of ice-water. The precipitate formed is collected, washed well with water and dried in vacuo at 30° C. The solid thus obtained is dissolved in 15 ml. of dry acetone and this solution next refluxed with 3 g. of anhydrous potassium acetate for 20 hours. The solvent is removed by distillation and the residue is diluted with ice water. The precipitate is collected, washed well with water, dried and recrystallized from acetone:hexane to yield 16β-difluoromethyl-21-acetoxypregn-4 - ene - 3,20-dione.

A suspension of 1 g. of 16β-difluoromethyl-21-acetoxypregn-4-ene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 16β-difluoromethylpregn-4-en-21-ol - 3,20-dione which is recrystallized from acetone:hexane.

To a cooled solution (0° C.) of 3.4 g. of 16β-difluoromethylpregn-4-en-21-ol-3,20-dione in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 16β-difluoromethyl-21-iodopregn-4-ene-3,20-dione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 16β-difluoromethyl-21-fluoropregn-4-ene-3,20-dione which is recrystallized from methanol:acetone.

EXAMPLE 15

A mixture of 1 g. of 16β-difluoromethylpregn-4-en-17α-ol-3,20-dione, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and the extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried and evaporated to yield 16β-difluoromethyl-17α-acetoxypregn-4-ene-3,20-dione which is recrystallized from acetone:hexane.

In like manner, the other 17α-carboxylic acid esters of the present invention can be prepared by substituting an alternate acyl anhydride. Similarly, the foregoing reaction conditions can be used to prepare esters at the other positions of the molecule, such as the C–21 esters. Alternatively, the 21-esters can be prepared by treatment of the hydroxyl with a carboxylic acid anhydride and pyridine.

EXAMPLE 16

A solution of 200 mg. of 16-difluoromethylenepregn-4-ene-3,20-dione in 32 ml. of anhydrous isopropanol and 25 mg. of sodium borohydride is stirred at room temperature for 15 hours. One hundred ml. of water is added and the resulting suspension extracted several times with ether. The ether phase is dried over sodium sulfate and evaporated to dryness under reduced pressure to yield 16-difluoromethylenepregn-4-en-3β-ol-20-one which may be further purified by recrstallization from ether.

A mixture of 1 g. of 16-difluoromethylenepregn-4-ene-3β-ol-20-dione, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-16-difluoromethylenepregn-4-en-20-one which may be further purified through recrystallization from acetone:hexane.

In like manner, the corresponding C–3 esters of the other compounds of the present invention can be prepared by first reducing as set forth in the first paragraph hereof followed by esterification with an alternate carboxylic acid anhydride.

Two milliliters of dihydropyran are added to a solution of 1 g. of 16-difluoromethylenepregn-4-en-3β-ol-20-one in 15 ml. of benzene. About 1 ml. is removed by distillation to remove moisture and 0.04 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β - tetrahydropyran-2′-yloxy-16-difluoromethylenepregn-4-en-20-one which is recrystallized from pentane.

In like manner the corresponding C–3 tetrahydropyranyl ethers of the other compounds of the present invention are prepared.

To a solution of 1 g. of 16-difluoromethylenepregn-4-en-3β-ol-20-one in 20 ml. of benzene, is added 20 ml. of dihydrofuran. Five milliliters is distilled off to remove moisture, and the mixture is allowed to cool to room temperature. To the cooled mixture, 0.02 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallized on the addition of ether to yield the 3β-tetrahydrofuran-2′-yloxy-16-difluoromethylenepregn-4-en-20-one.

In like manner, the corresponding C-3 tetrahydrofuranyl ethers of the other compounds of the present invention are prepared.

In accordance with the methods hereof the following compounds are prepared:

6-chloro-16-difluoromethylene-17α-acetoxypregna-4,6-diene-3,20-dione,
6-chloro-16β-difluoromethyl-17α-acetoxypregna-4,6-diene-3,20-dione,
1α,2α-methylene-6-chloro-16-difluoromethylene-17α-acetoxypregna-4,6-diene-3,20-dione,
1α,2α-methylene-6-chloro-16β-difluoromethyl-17α-acetoxypregna-4,6-diene-3,20-dione,
6-methyl-16-difluoromethylene-17α-acetoxypregna-4,6-diene-3,20-dione,
6-methyl-16β-difluoromethyl-17α-acetoxypregna-4,6-diene-3,20-dione,
6α,7α-difluoromethylene-6β-chloro-16-difluoromethylene-17α-acetoxypregna-1,4-diene-3,20-dione,
6α,7α-difluoromethylene-6β-chloro-16β-difluoromethyl-17α-acetoxypregna-1,4-diene-3,20-dione,
6α,7α-difluoromethylene-6β-fluoro-16-difluoromethylene-17α-acetoxypregna-1,4-diene-3,20-dione,
6α,7α-difluoromethylene-6β-fluoro-16β-difluoromethyl-17α-acetoxypregna-1,4-diene-3,20-dione,
16-difluoromethylene-17α-propionyloxy-19-norpregn-4-ene-3,20-dione,
16β-difluoromethyl-17α-propionyloxy-19-norpregn-4-ene-3,20-dione,
16-difluoromethylenepregn-4-en-17α-ol-3,20-dione,
16β-difluoromethylpregn-4-en-17α-ol-3,20-dione,
1α,2α-methylene-6α,7α-difluoromethylene-16-difluoromethylene-17α-acetoxypregn-4-ene-3,20-dione,
1α,2α-methylene-6α,7α-difluoromethylene-16β-difluoromethyl-17α-acetoxypregn-4-ene-3,20-dione,
1α,2α-methylene-3β,17α-diacetoxy-16-difluoromethylene-pregna-4,6-diene-3,20-dione,
1α,2α-methylene-3β,17α-diacetoxy-16β-difluoromethyl-pregna-4,6-diene-3,20-dione,
9α-fluoro-16-difluoromethylene-17α-pentanoyloxypregna-1,4-diene-11β,21-diol13,20-dione,
9α-fluoro-16β-difluoromethyl-17α-pentanoyloxypregna-1,4-diene-11β,21-diol-3,20-dione,
6α,9α-difluoro-16-difluoromethylene-17α-pentanoyloxypregna-1,4-diene-11β,21-diol-3,20-dione,
6α,9α-difluoro-16β-difluoromethyl-17α-pentanoyloxypregna-1,4-diene-11β,21-diol-3,20-dione,
6α,9α-difluoro-16-difluoromethylene-21-acetoxypregna-1,4-diene-11β,17α-diol-3,20-dione,
6α,9α-difluoro-16β-difluoromethyl-21-acetoxypregna-1,4-diene-11β,17α-diol-3,20-dione,
6α,9α-difluoro-16-difluoromethylene-21-t-pentanoyloxypregna-1,4-diene-11β,17α-diol-3,20-dione,
6α,9α-difluoro-16β-difluoromethyl-21-t-pentanoyloxypregna-1,4-diene-11β,17α-diol-3,20-dione,
9α-chloro-16-difluoromethylene-17α,21-dipropionyloxypregna-1,4-dien-11β-ol-3,20-dione,
9α-chloro-16β-difluoromethyl-17α,21-dipropionyloxypregna-1,4-dien-11β-ol-3,20-dione,
6α,21-difluoro-9α,11β-dichloro-16-difluoromethylene-17α-acetoxypregna-1,4-diene-3,20-dione,
6α,21-difluoro-9α,11β-dichloro-16β-difluoromethyl-17α-acetoxypregna-1,4-diene-3,20-dione,
6α-fluoro-9α,11β,21-trichloro-16-difluoromethylene-17α-acetoxypregna-1,4-diene-3,20-dione,
α-fluoro-9α,11β,21-trichloro-16β-difluoromethyl-17α-acetoxypregna-1,4-diene-3,20-dione,
6α-fluoro-9α,11β-dichloro-16-difluoromethylene-17α-acetoxypregna-1,4-diene-3β,21-diol-3,20-dione,
6α-fluoro-9α,11β-dichloro-16β-difluoromethyl-17α-acetoxypregna-1,4-diene-3β,21-diol-3,20-dione,
9α,11β-dichloro-16-difluoromethylenepregna-4,6-diene-17α,21-diol-3,20-dione,
9α,11β-dichloro-16β-difluoromethylpregna-4,6-diene-17α,21-diol-3,20-dione,
6,6-difluoro-16-difluoromethylene-17α-acetoxypregna-4-ene-11β,21-diol-3,20-dione,
6,6-difluoro-16β-difluoromethyl-17α-acetoxypregn-4-ene-11β,21-diol-3,20-dione,
6,6-difluoro-16-difluoromethylene-17α-acetoxy-21-chloropregn-4-ene-3,20-dione,
6,6-difluoro-16β-difluoromethyl-17α-acetoxy-21-chloropregn-4-ene-3,20-dione,
6,6,9α,21-tetrafluoro-16-difluoromethylene-17α-propionyloxypregna-1,4-diene-3β,11β-diol-20-one, and
6,6,9α,21-tetrafluoro-16β-difluoromethyl-17α-propionyloxypregna-1,4-diene-3β,11β-diol-20-one.

What is claimed is:
1. A compound selected from those represented by the formulas:

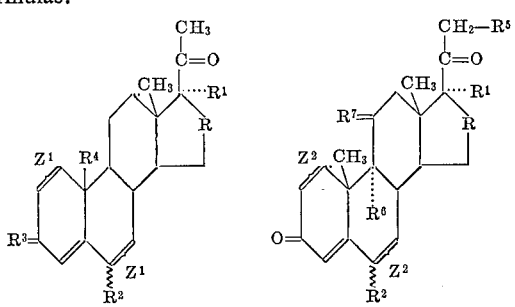

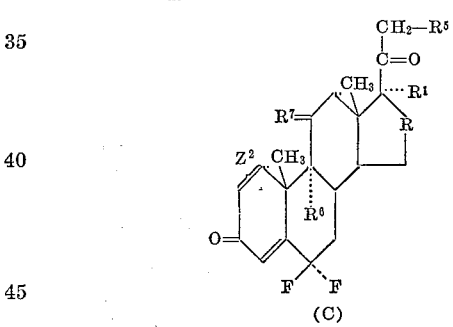

(C)

wherein, in each applicable formula,
R is the group

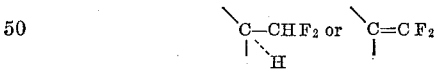

$R^1$ is hydrogen, hydroxy, or a conventional hydrolyzable ester;
$R^2$ is hydrogen, methyl, chloro, or fluoro;
$R^3$ is oxo or the group

wherein $R^8$ is hydroxy or a conventional hydrolyzable ester;
$R^4$ is hydrogen or methyl;
$R^5$ is hydroxy, a conventional hydrolyzable ester, bromo, chloro, or fluoro;
$R^6$ is hydrogen, chloro, or fluoro;
$R^7$ is oxo or the group

wherein $R^9$ is hydroxy or chloro;
$Z^1$ is a carbon-carbon single bond, a carbon-carbon double bond, or the group

wherein X is hydrogen or fluoro; and $Z^2$ is a carbon-carbon single bond or a carbon-carbon double bond;
provided that,
(1) $R^4$ is hydrogen only when $Z^1$ (at C-1,2 position) is a carbon-carbon single bond,
(2) when $R^9$ is chloro, $R^6$ is chloro,
(3) in Formula A at least one $Z^1$ is other than a single bond, and
(4) in Formula B, $R^5$ is bromo, chloro, or fluoro, and/or $R^9$ and $R^6$ are each chloro.

2. A compound according to those of Formula A of claim 1.

3. A compound according to claim 2 wherein $R^1$ is hydroxy or a conventional hydrolyzable ester thereof, $R^2$ is chloro, $R^3$ is oxo, $R^4$ is methyl, $Z^1$ at C-1,2 is a single bond, and $Z^1$ at C-6,7 is a double bond.

4. A compound according to claim 3 wherein $R^1$ is acetoxy.

5. A compound according to claim 2 wherein $R^1$ is acetoxy, $R^2$ is chloro, $R^3$ is oxo, $R^4$ is methyl, $Z^1$ at C-1,2 position is the group

wherein X is hydrogen, and $Z^1$ at C-6,7 is a double bond.

6. A compound according to claim 2 wherein $R^1$ is acetoxy, $R^2$ is methyl, $R^3$ is oxo, $R^4$ is methyl, $Z^1$ at C-1,2 is a single bond and $Z^1$ at C-6,7 is a double bond.

7. A compound according to claim 2 wherein $R^1$ is acetoxy, $R^2$ is $\beta$-chloro, $R^3$ is oxo, $R^4$ is methyl, $Z^1$ at C-1,2 is a double bond and $Z^1$ at C-6,7 is $\alpha$-difluoromethylene.

8. The process which comprises:
(I) treating a steroid of the pregnane and 19-nor-pregnane series having, as the only site of keto conjugated unsaturation the $\Delta^{16}$-20-keto functional system, with difluoromethylphenylsulfone and an alkali metal alkoxide to prepare the corresponding 16$\alpha$-(benzenesulfonyldifluoromethyl)-20-keto steroid; and
(II) treating the product of step (I):
(a) with an alkali metal alkoxide to prepare the corresponding 16 - difluoromethyl - $\Delta^{16}$-20-keto compound and hydrogenating the latter to prepare the corresponding 16$\beta$ - difluoromethyl-20-keto steroid; or
(b) by reduction to prepare the corresponding 16$\alpha$ - (benzenesulfonyldifluoromethyl) - 20-hydroxy steroid, treating the latter with an alkali metal alkoxide in organic solution to prepare the corresponding 16 - difluoromethylene - 20-hydroxy steroid, and oxidizing the latter to prepare the corresponding 16-difluoromethylene-20-keto steroid; or
(c) treating the product of step (b) with base to prepare the corresponding 16 - difluoromethyl-$\Delta^{16}$-20 - keto compound and hydrogenating the latter to prepare the corresponding 16$\beta$-difluoromethyl-20-keto steroid; and, if desired,
(d) hydroxylating the product of steps (a), (b) and (c) to prepare the corresponding 16$\beta$-difluoromethyl-17$\alpha$-hydroxy-20-keto, 16-difluoromethylene-17$\alpha$-hydroxy-20-keto, and 16$\beta$-difluoromethyl-17$\alpha$-hydroxy-20-keto compounds, respectively; followed, in optional order and to the extent required and desired, by:
(1) introduction of keto conjugated unsaturation in Rings A and B;
(2) introduction of an 11$\beta$-hydroxy group;
(3) introduction of C-11 keto oxygen;
(4) introduction of C-21 elaboration;
(5) introduction of C-17$\alpha$ elaboration;
(6) introduction of C-9,11 halogen;
(7) introduction of C-6 halo or methyl;
(8) introduction of C-1,2 methylene or difluoromethylene;
(9) introduction of C-6,7 methylene or difluoromethylene;
(10) reduction of C-3 keto to C-3 hydroxy; and;
(11) esterification of C-3 hydroxy.

9. The process which comprises treating a steroid of the pregnane and 19-nor pregnane series having, as the only site of keto conjugated unsaturation the $\Delta^{16}$-20-keto functional system, with difluoromethylphenylsulfone and an alkali metal alkoxide to prepare the corresponding 16$\alpha$-(benzenesulfonyldifluoromethyl)-20-keto steroid.

10. The process according to claim 9 including the additional steps of treating the 16$\alpha$-(benzenesulfonyldifluoromethyl)-20-keto steroid with an alkali metal alkoxide to prepare the corresponding 16 - difluoromethyl-$\Delta^{16}$-20-keto compound and hydrogenating the latter to prepare the corresponding 16$\beta$-difluoromethyl-20-keto steroid.

11. The process according to claim 9 including the additional steps of reducing the 16$\alpha$-(benzenesulfonyldifluoromethyl)-20-keto steroid to prepare the corresopnding 16$\alpha$ - benzenesulfonyldifluoromethyl) - 21 - hydroxy steroid, treating the latter with an alkali metal alkoxide in organic solution to prepare the corresponding 16-difluoromethylene-20-hydroxy steroid and oxidizing the latter to prepare the corresponding 16-difluoromethylene-20-keto steroid.

12. The process according to claim 9 including the additional step of treating the 16$\alpha$-(benzenesulfonyldifluoromethyl)-20-keto steroid with an alkali metal alkoxide to prepare the corresponding 16-difluoromethyl-$\Delta^{16}$-20-keto steroid.

13. The process according to claim 9 including the additional steps of reducing the 16$\alpha$-(benzenesulfonyldifluoromethyl)-20-keto steroid to prepare the corresponding 16$\alpha$ - (benzenesulfonyldifluoromethyl) - 20 - hydroxy steroid and treating the latter with an alkali metal alkoxide in organic solution to prepare the corresponding 16-difluoromethylene-20-hydroxy steroid.

References Cited
UNITED STATES PATENTS 3,155,695  11/1964  Bowers et al. _____ 260—397.45

ELBERT L. ROBERTS, Primary Examiner

U.S. Cl. X.R.

260—239.55 R, 239.55 C, 397.3, 397.45, 397.47, 397.5